United States Patent [19]

Rouy

[11] Patent Number: 5,133,976
[45] Date of Patent: Jul. 28, 1992

[54] FERMENTATION PROCESS FOR PRODUCING LYSINE SULPHATE FOR ANIMAL NUTRITION

[75] Inventor: Noel Rouy, Yerres, France

[73] Assignee: Rhone-Poulenc Sante, France

[21] Appl. No.: 662,990

[22] Filed: Feb. 28, 1991

Related U.S. Application Data

[63] Continuation of Ser. No. 462,988, Jan. 10, 1990, abandoned, which is a continuation of Ser. No. 585,395, Mar. 2, 1984, abandoned.

[30] Foreign Application Priority Data

Mar. 3, 1983 [FR] France ................. 83 03487

[51] Int. Cl.$^5$ .................. A23K 1/00; A23K 1/22; C12P 13/08
[52] U.S. Cl. ........................ 426/2; 426/69; 426/807; 435/115; 435/843
[58] Field of Search ............... 435/115, 843; 426/2, 426/69, 807

[56] References Cited

U.S. PATENT DOCUMENTS

| | | | |
|---|---|---|---|
| 3,527,672 | 9/1970 | Kubota et al. | 435/115 |
| 3,871,960 | 3/1975 | Kubota et al. | 435/115 |
| 3,9359,075 | 5/1976 | Inuzuka et al. | 435/115 |

FOREIGN PATENT DOCUMENTS

| | | | |
|---|---|---|---|
| 139205 | 12/1979 | Fed. Rep. of Germany | 435/115 |
| 31794 | 8/1974 | Japan . | |
| 29289 | 2/1982 | Japan | 435/115 |
| 480397 | 8/1975 | U.S.S.R. . | |
| 2057244 | 4/1981 | United Kingdom . | |
| 2120240 | 11/1983 | United Kingdom | 426/69 |

*Primary Examiner*—David M. Naff
*Attorney, Agent, or Firm*—Morgan & Finnegan

[57] ABSTRACT

A stable composition containing 35 to 48% lysine sulphate for animal nutrition is prepared by culturing a lysine-producing microorganism in a culture medium and adding sulfuric acid or ammonium sulphate during culturing to convert lysine as it is formed to lysine sulphate. The culture medium contains ammonia and ammonium sulphate, and a carbon source selected from glucose, sucrose and starch hydrolyzates in an amount such that the total weight ratio of fermentable substances/solids is greater than 80%. The concentration of the carbon source is maintained at 5 to 15 g/liter and ammonia is added during culturing to maintain an ammonium ion concentration of 1 to 5 g/liter. After allowing concentration of the carbon source to fall to less than 2 g/liter, culturing is stopped and the resultant cultured medium is concentrated and dried. The composition has good stability in moist air and preferably has a microporosity of about 0.3 cm$^3$/g and a surface area of about 0.5 m$^2$/g.

4 Claims, No Drawings

FERMENTATION PROCESS FOR PRODUCING LYSINE SULPHATE FOR ANIMAL NUTRITION

This is a continuation of co-pending application Ser. No. 07/462,988, filed on Jan. 10, 1990, now abandoned, which is a continuation application of Ser. No. 06/585,395, Mar. 2, 1984, abandoned.

The present invention provides lysine-containing concentrates for animal nutrition, and a process for their preparation.

Lysine is an essential amino acid for monogastric animals, and is used, in particular, in animal nutrition. It can be prepared either by a chemical route or by a biochemical route. Although the biochemical processes are of more interest economically than the chemical processes, only low yields of lysine are obtained and therefore special installations and expensive components need to be used.

Lysine intended for animal nutrition is mixed with various foodstuffs, such as cereals, the composition of which is quite poorly defined. Under these conditions, it has not appeared necessary to use purified lysine.

It has been shown that the concentrated culture media from fermentations which produce lysine have the same nutritive properties as purified lysine. The biomass and the various constituents of the culture medium which are necessary for the production of lysine or their derived products do not have any detrimental effect on the animals. However, these media, once concentrated to an extent such that a sufficient content of lysine for the intended use is achieved, are viscous liquids which are difficult to mix with animal feedstuffs.

Totally dehydrated culture media are paste-like, tacky and very hygroscopic solids which are thus difficult to manipulate.

It has been proposed in Russian Patent 480,397 and in French Patent Application 73 40738 (publication No. 2,217,347), to prepare solid compositions obtained from concentrated culture media from the fermentation of lysine to which, where appropriate, dehydrating agents are added. However, these compositions do not always have the required quality, are frequently hygroscopic, and occasionally necessitate the use of an additive in an amount such that the lysine content in the final composition is too low.

It has also been proposed in French Patent Application No. 79 21646, (publication No. 2,464,032), to obtain a stable, solid composition which can easily be manipulated, does not increase in weight in the presence of moisture and contains 10 to 35% of lysine, by adding an additive, in the form of lime in the presence of carbon dioxide or precipitated magnesium carbonate, to a concentrated culture medium from a fermentation which produces lysine. These compositions have relatively low lysine contents and high contents of additive.

It has now been found that it is possible to obtain industrially, and in a reproducible manner, a composition having a high content of lysine with the required characteristics for use in animal nutrition from a concentrated culture medium originating from culture, under well-defined conditions, of a microorganism which produces lysine.

The present invention more particularly provides a solid and stable composition for animal nutrition containing from 35 to 48% by weight of lysine, expressed as lysine base, and delivered from a lysine-producing culture medium.

Preferably, the composition has the following properties:

A high content of lysine which is from 35 to 48% by weight, expressed as lysine base.

Stability in moist air, even under more unfavourable conditions than those usually encountered during its use, without notable alteration of mechanical properties, in particular in relation to the formation of lumps or agglomerates or the appearance of adhesion phenomena. For example, when left at 25° C. in an atmosphere of 90% relative humidity for 120 hours, the amount of water taken up by the composition is in general from 5 to 10% and is equivalent to that of crystalline lysine hydrochloride. In an atmosphere of 70% relative humidity, the amount of water taken up is in general from 2 to 5%.

Storage stability of the compound per se. The decrease in lysine content is not greater than 5% after 1 month of storage at 50° C. and is zero after 6 months of storage at 25° C.

Pourability determined either by the sand-phase test through calibrated holes (the pouring time for 50 g of compound is from 40 to 45 seconds in a sand-glass having an aperture of 5 mm diameter), or by the angle of repose test, this angle usually being from 30° to 35°, or by the inclined plane angle test, this angle in general being from 28° to 30°.

Absence of a tendency to agglomerate in the "lumping" test in a compressometer.

Suitability for mixing in complete feedstuffs and in premixes prepared for animal nutrition. The homogeneity of the incorporation is measured by the dispersion of the levels measured, which is usually less than 5% whatever the doses of lysine added, expressed in lysine base, which may vary from 0.05 to 20%.

Stability in complete feedstuffs and/or premixes after incorporation of the compound: after 2 months storage at temperatures which may reach 50° C., the decrease in lysine content is in general less than 10%, and no decrease in lysine content at all is observed after 6 months storage at 25° C.

A composition according to the invention may also be defined in the following manner:

Fine pink-beige to brown powder;
Apparent density from 0.4 to 0.6;
Percentage composition:

| | | |
|---|---|---|
| solids | 95 to 98% | |
| lysine (expressed as the base) | 35 to 48% | |
| proteins | 10 to 15% | (1) |
| total free amino acids, other than lysine | 1 to 3% | (2) |
| lactic acid | 0.5 to 3% | (3) |
| other acids containing less than 8 carbon atoms | 2 to 10% | (3) |
| polysaccharides, oligosaccharides | 2 to 7% | (4) |
| fatty substances, oils | 1 to 6% | (5) |
| water | 0.5 to 3% | |
| mineral substances | 10 to 25% | (6) |

(1) The content of proteins is determined from the content of organic nitrogen, itself determined by conventional methods (total nitrogen minus mineral nitrogen). The nitrogen content corresponding to the lysine and the other free amino acids, which are determined and analysed by chromatography on ion exchange resins or by colorimetry, is deduced.

(2) Determined on a BIOTRONIC apparatus.

(3) Determined by gas phase chromatography, after derivatisation.

(4) Determination of the reducing sugars, after hydrolysis.

(5) Determined after extraction with ethyl ether.

(6) Determination of the sulphur ash. The mineral content originates from the constituents of the fermentation medium and from the salification of the lysine as its formation proceeds.

Taking into account the variations in the composition of the substrates used in the fermentation medium and the inherent fluctuations in any fermentation process, the characteristics of a composition according to the invention may vary slightly from the values given above.

The composition according to the invention may be obtained from a must from a fermentation which produces lysine.

Lysine is produced by culture of at least one microorganism which is highly productive in lysine, for example, from the Brevibacterium or Corynebacterium genus, in an appropriate medium containing at least one assimilable carbon source, at least one assimilable nitrogen source and preferably mineral salts, preferably at a temperature from 25° to 40° C. and at a pH from 5 to 8. In conventional culture media, the carbon and nitrogen sources are usually complex mixtures, such as sugar-beet or cane sugar molasses, maize extracts or soya flour hydrolysates. When such media are used, the concentrated culture media, after subsequent dehydration, provide products which do not have the required qualities.

In order to obtain the desired results, it is necessary for the culture media, the inoculum medium and the production medium to contain less complex constituents, the content and quality of which are controllable. In particular, it is important to use a carbon source which makes it possible to achieve a weight ratio of fermentable substance/total solids of greater than 80%, it being understood that the fermentable substances are substances which are effectively metabolised during the fermentation, even if they are not directly assimilable by the producing strain. Examples of carbon sources are glucose, sucrose, starch hydrolysates and any other mixture which introduces an assimilable carbon- and oxygen- containing compound at a sufficiently high level of purity. The other constituents necessary for growth of the microorganism and production of lysine are preferably introduced in the form of virtually pure or at least concentrated compounds.

The culture is carried out so that the concentration of the principal reactants in the medium is maintained at previously determined values. It is thus possible to control not only the formation of the lysine but also the formation of by-products which originate from the normal metabolism of the producing strain or even of its possible deviations and which play an important part in the properties of the final composition.

In order to achieve salification of the lysine as its formation progresses, it is advantageous to add a mineral acid, such as sulphuric acid or phosphoric acid, during the course of the culture, either continuously or in successive additions. For reasons of convenience, the salification can be carried out by adding to the culture medium an ammonium salt, such as ammonium sulphate, in the presence of ammonia, or ammonia in the presence of an acid, such as sulphuric acid, in a manner such that the concentration of ammonium ions is kept constant and the pH is controlled.

The fermentation time is in general from 30 to 100 hours, the fermentation being stopped when the concentrations of the assimilable carbon substrate and nitrogen substrate become low enough, for example, when the concentration of residual sugar reaches less than 2 g/liter. In this way, concentration of the culture medium can be undertaken without any prior separation.

The solids content of the culture medium before concentration is in general from 10 to 20% by weight.

The culture medium is concentrated by the usual techniques which allow destruction of the living microorganisms without degradation of the lysine. For example, concentration may be carried out in a thin film evaporator heated by steam at 130° C. making it possible for the temperature of the concentrated culture medium to reach 110°-120° C.

In general, the medium is concentrated until the solids content is from 50 to 70% by weight.

The concentrate thus obtained is then dehydrated by the usual techniques, if necessary after addition of adjuvants to facilitate formation of the end product under conditions such that the characteristics and composition of the product are not substantially modified. Various methods of dehydration can be used, for example, atomisation, kneading-granulation, drying-flaking, or azeotropic dehydration in the presence of a suitable solvent.

In general, the dehydration is carried out under conditions such that the end product is not degraded. For example, if azeotropic distillation is used, the concentrated culture medium is mixed with a compatible solvent which is acceptable from the nutrition point of view and the mixture is distilled, preferably under reduced pressure. To this effect, it is particularly useful to use a paraffin oil having nutritional qualities as a solvent. At the end of azeotropic distillation, the dehydrated composition is in suspension in the solvent, from which it is separated by filtration and dried.

The characteristics of the composition of the invention are largely determined by the chemical composition of the product obtained. They are also influenced by the structure of the solid obtained at the end of the dehydration operation.

It is particularly advantageous to conduct the preparation process in a manner such that the product obtained has a degree of crystallinity of 50% (determination by x-ray diffraction), a microporosity of 0.3 $cm^3$/gram and a specific surface area of 0.5 $m^2$/gram.

Because of the fermentation medium used and the acid added in the course of fermentation, the lysine may be in the final product in the form of a salt, for example in the form of a sulphate.

Whatever the dehydration process used, the product obtained can be used directly for incorporation into animal feedstuffs.

The product of the invention is particularly useful in animal nutrition. Since it is solid and does not substantially increase in weight in the presence of moisture, it mixes perfectly with feedstuffs given to animals. On account of the stability of the product obtained, the complete feedstuffs can be prepared a long time before being used.

The nutritional compositions containing the product according to the invention exhibit, both in chickens and pigs, an effectiveness equivalent to that of purified lysine hydrochloride.

The following example shows how the invention can be used in practice.

EXAMPLE

Water (3 liters) and maize extract 250 g) are placed in a fermenter (20 liters) equipped with a stirring and aeration system.

The mixture is sterilized by bubbling in steam at 120° C. for 20 minutes. After cooling to 35° C., the volume is adjusted to 5 liters by addition of sterile water.

A solution (8 liters) of glucose containing 650 g/liter, a solution (1 liter) of ammonium sulphate containing 500 g/liter, a 15% (weight/volume) solution (2 liters) of ammonia, a solution (0.15 liter) of leucine phosphate containing 10 g of leucine and soya oil (0.1 liter) are then prepared, in the form of sterile solutions.

The pH is adjusted to 7.30 by addition of sterile ammonia.

The fermenter is seeded with an inoculum culture (500 cc) of a strain of *Corynebacterium glutamicum* produced in a flask (2 liters) using a culture medium analogous to that described above.

Stirring is regulated to 500 revolutions/minute and the aeration is regulated to 600 liters/hour.

The fermentation medium is fed with the solution of glucose such that the glucose content is from 5 to 15 g/liter, with the solution of ammonia to maintain the pH at 7.30 and with the solution of ammonium sulphate such that the concentration of ammonium ions is from 1 to 5 g/liter.

The fermentation medium is fed with the solution of leucine phosphate at a rate of 3 cc/hour, and is fed intermittently with soya oil in order to control the frothing.

After 50 hours of culture at 35° C., a mixture (about 12 liters) containing 70 g/liter of lysine, expressed as lysine base, and 15% by weight of solids is harvested.

The must containing 15% of solids is concentrated under reduced pressure in a thin film evaporator heated by steam at 130° C. The temperature of the mixture is maintained around 90° C. Concentration is continued until a concentrate containing 60% by weight of solids is obtained.

The concentrate containing 60% of solids is added to a flask equipped with a stirrer and containing a paraffin oil (2 liters) the boiling point of which is greater than 160° C., and the mixture is distilled under reduced pressure (4 to 13.3 kPa), the water being separated from the condensate.

A suspension of a powder in the oil is finally obtained at a temperature of about 100° C.

The powder is separated off by filtration and dried in a drying cabinet. A product (245 g) having the following characteristics is obtained:

fine rose-beige to darker brown powder
apparent density: 0.52
Lysine content: (in the form of the base) 44%
percentage composition:

| solids | about 97% |
| --- | --- |
| proteins | 13% |
| oil, fatty substances | 1.2% |
| mineral substances | 3.8% |
| total phosphorus | 0.35% |
| total amino acids (excluding lysine) | 2.5% |
| sulphate ions (expressed as $H_2SO_4$) | 14.5% |
| water | 1.2% |

I claim:

1. A process for preparation of a solid and stable composition containing lysine consisting of lysine in the form of lysine sulphate in a proportion of 35 to 48%, expressed as lysine base, by weight of the composition, which process consists of culturing a lysine producing microorganism in a culture medium consisting of ammonia and ammonium sulphate and at least one source of assimilable carbon selected from the group consisting of glucose, sucrose and starch hydrolysates, in an amount such that the total weight ratio of fermentable substances/solids is greater than 80%, the concentration of the glucose, sucrose or starch hydrolysates being maintained at 5 to 15 g/liter, and during the course of culturing adding ammonia to maintain an ammonium ion concentration of 1 to 5 g/liter, the lysine being converted to lysine sulphate as it is formed by continual addition or successive addition of sulfuric acid or ammonium sulphate during the course of culturing, allowing the concentration of the glucose, sucrose or starch hydrolysates to fall to less than 2 g/liter and stopping the fermentation to produce a culture medium containing 10 to 20% by weight of solids, concentrating the culture medium to produce a concentrate having a solids content of 50 to 75% by weight, and finally dehydrating the concentrate by azeotropic distillation or drying-flaking.

2. A solid and stable composition for animal nutrition containing from 35 to 48% of lysine, expressed as lysine base, in the form of lysine sulphate and obtained by the process of claim 1.

3. A composition according to claim 2 which has a microporosity of about 0.3 cm$^3$/g. and a specific surface area of about 0.5 m$^2$/g.

4. A method of feeding a monogastric animal which comprises administering thereto a solid and stable composition containing lysine in an amount to provide a substantial part of the lysine in the form of lysine sulphate requirements of said animal, said composition of from 35 to 48% as lysine, expressed as lysine base, by weight of the composition, said composition being obtained by a process which consists of culturing a lysine-producing microorganism in a culture medium consisting of ammonia and ammonium sulphate and at least one source of assimilable carbon selected from the group consisting of glucose, sucrose and starch hydrolysates, in an amount such that the total weight ratio of fermentable substances/solids is greater than 80%, the concentration of the glucose, sucrose or starch hydrolysates being maintained at 5 to 15 g/liter, and during the course of culturing adding ammonia to maintain an ammonium ion concentration of 1 to 5 g/liter, the lysine being converted to lysine sulphate as it is formed by continual addition or successive addition of sulphuric acid or ammonium sulphate during the course of culturing, allowing the concentration of the glucose, sucrose or starch hydrolysates to fall to less than 2 g/liter and stopping the fermentation to produce a culture medium containing 10 to 20% by weight of solids, concentrating the culture medium to produce a concentrate having a solids content of 50 to 75% by weight, and finally dehydrating the concentrate by azeotropic distillation or drying-flaking.

* * * * *